US009312532B2

(12) United States Patent
Umeno et al.

(10) Patent No.: US 9,312,532 B2
(45) Date of Patent: Apr. 12, 2016

(54) NEGATIVE ELECTRODE MATERIAL FOR LITHIUM ION SECONDARY BATTERIES, AND METHOD FOR PRODUCING SAME

(75) Inventors: Tatsuo Umeno, Fukuoka (JP); Tadanori Tsunawaki, Fukuoka (JP); Koutarou Mizuma, Fukuoka (JP); Shinya Okabe, Fukuoka (JP); Shiroh Oie, Fukuoka (JP)

(73) Assignee: Nippon Coke & Engineering Co., Ltd., Tokyo (JP)

( * ) Notice: Subject to any disclaimer, the term of this patent is extended or adjusted under 35 U.S.C. 154(b) by 290 days.

(21) Appl. No.: 13/991,529

(22) PCT Filed: Dec. 6, 2011

(86) PCT No.: PCT/JP2011/078122
§ 371 (c)(1),
(2), (4) Date: Aug. 9, 2013

(87) PCT Pub. No.: WO2012/077653
PCT Pub. Date: Jun. 14, 2012

(65) Prior Publication Data
US 2013/0309578 A1    Nov. 21, 2013

(30) Foreign Application Priority Data

Dec. 8, 2010 (JP) ................................. 2010-273951

(51) Int. Cl.
*H01M 4/13* (2010.01)
*H01M 4/04* (2006.01)
(Continued)

(52) U.S. Cl.
CPC ........... *H01M 4/0407* (2013.01); *C04B 35/522* (2013.01); *C04B 35/532* (2013.01);
(Continued)

(58) Field of Classification Search
None
See application file for complete search history.

(56) References Cited

U.S. PATENT DOCUMENTS 6,040,092 A * 3/2000 Yamada et al. ............... 429/331
6,432,583 B1 * 8/2002 Fukuda et al. ............. 429/231.4
(Continued)

FOREIGN PATENT DOCUMENTS

JP    7-230803 A    8/1995
JP    11-199211 A    7/1999
(Continued)

OTHER PUBLICATIONS

International Search Report Dated Feb. 23, 2012, Mailed Mar. 6, 2012.
Translation of International Search Report Dated Feb. 23, 2012, Mailed Mar. 6, 2012.

*Primary Examiner* — Patrick Ryan
*Assistant Examiner* — Jose Colucci Rios
(74) *Attorney, Agent, or Firm* — Norris McLaughlin & Marcus PA

(57) ABSTRACT

A negative electrode material for lithium ion secondary batteries comprises amorphous coated particles that are composed of a plurality of consolidated particles having no specific shape, said consolidated particles being obtained by consolidating a plurality of primary spheroidized graphite particles, and 0.5-20% by mass of an amorphous carbon layer that covers the surfaces of the consolidated particles and binds the consolidated particles with each other; and 0.5-20% by mass of a highly crystalline carbon layer that is formed so as to cover the outer surfaces of the amorphous coated particles and has an interplanar distance ascribed to CVD processing of 0.335 nm or more but less than 0.3369 nm. The negative electrode material for lithium ion secondary batteries is also characterized by having a porosity of 5% by volume or less, and a method for producing the negative electrode material for lithium ion secondary batteries.

10 Claims, 2 Drawing Sheets

(51) Int. Cl.
*H01M 4/36* (2006.01)
*H01M 4/587* (2010.01)
*H01M 4/583* (2010.01)
*C04B 35/52* (2006.01)
*C04B 35/532* (2006.01)
*C04B 35/628* (2006.01)
*H01M 4/133* (2010.01)
*H01M 10/0525* (2010.01)
*H01M 4/02* (2006.01)

(52) U.S. Cl.
CPC ......... *C04B35/62839* (2013.01); *H01M 4/366* (2013.01); *H01M 4/583* (2013.01); *H01M 4/587* (2013.01); *C04B 2235/425* (2013.01); *C04B 2235/528* (2013.01); *C04B 2235/5436* (2013.01); *H01M 4/133* (2013.01); *H01M 10/0525* (2013.01); *H01M 2004/021* (2013.01); *Y02T 10/7011* (2013.01)

(56) References Cited

U.S. PATENT DOCUMENTS

| | | | |
|---|---|---|---|
| 2002/0197534 A1* | 12/2002 | Fukuda et al. | 429/231.4 |
| 2004/0124402 A1* | 7/2004 | Nanba et al. | 252/500 |
| 2006/0238958 A1* | 10/2006 | Nakamura et al. | 361/502 |
| 2008/0020282 A1* | 1/2008 | Kim et al. | 429/231.8 |
| 2010/0086856 A1 | 4/2010 | Matsumoto | |

FOREIGN PATENT DOCUMENTS

| | | |
|---|---|---|
| JP | 2003-238135 A | 8/2003 |
| JP | 2004-210634 A | 7/2004 |
| JP | 2005-50807 A | 2/2005 |
| JP | 2011-60465 A | 3/2011 |
| JP | 2011-243567 A | 12/2011 |
| WO | 2008/084675 | 7/2008 |

\* cited by examiner

Fig. 2
Fig. 2(a)
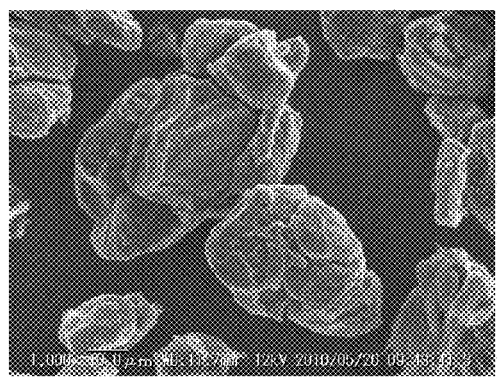
Fig. 2(b)
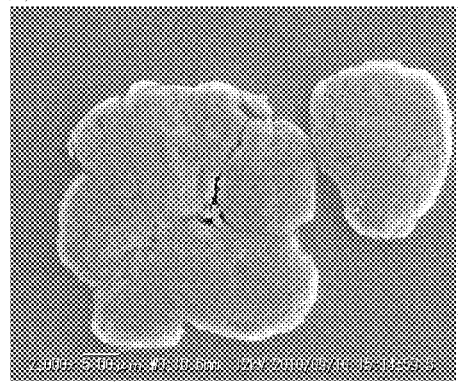
Fig. 3
Fig. 3(a)
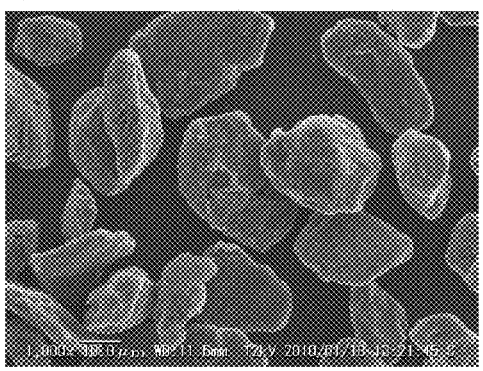
Fig. 3(b)
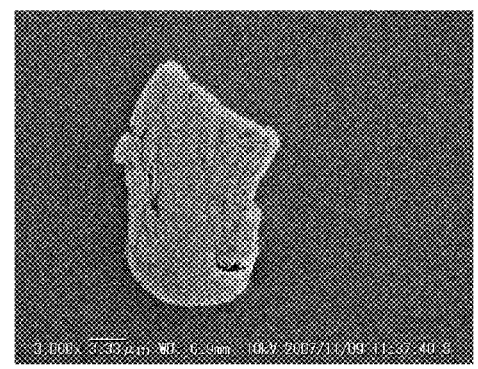
Fig. 4
Fig. 4(a)
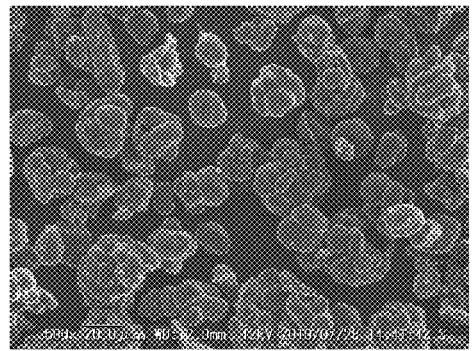
Fig. 4(b)
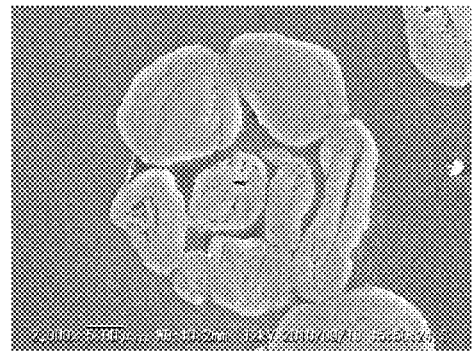

NEGATIVE ELECTRODE MATERIAL FOR LITHIUM ION SECONDARY BATTERIES, AND METHOD FOR PRODUCING SAME

This application is a 371 application of PCT/JP2011/078122 filed Dec. 6, 2011, which claims foreign priority benefit under 35 U.S.C. §119 of Japanese application Nos. 2010-273951 filed Dec. 8, 2010.

TECHNICAL FIELD

The present invention relates to a negative electrode material for lithium ion secondary batteries, produced using primary spheroidized graphite particles as a raw material, as well as to a method for producing the same.

BACKGROUND ART

The demand for lithium ion secondary battery is increasing rapidly for its use as a power source for electric automobile, hybrid automobile, electronic appliances, etc. With respect to the negative electrode material of the lithium ion secondary battery, the main stream is graphite particles.

The graphite used as the negative electrode material of the lithium ion secondary battery can be largely divided into natural graphite and artificial graphite. The graphite particles obtained by grinding natural graphite have a scaly (sheet-like) shape and show striking anisotropy caused by the crystal structure.

That is, natural graphite has a crystal structure in which a large number of AB planes each having large area are laminated in the C axis direction. In natural graphite particles, the thickness of lamination in C axis direction is small as compared to the area of AB plane; consequently, the natural graphite particles have a scaly shape as a whole.

Meanwhile, artificial graphite particles can be produced so as to have a nearly spherical shape by selecting the production method therefor. Artificial graphite particles can also be produced so as to have a crystal structure low in anisotropy.

For example, there can be produced spherical graphite particles in which a plurality of disc-like graphites of different radii are orientated randomly and laminated, or there can be produced columnar graphite particles in which a plurality of disc-like graphites of same radius are laminated with the AB planes being arranged in parallel.

Such artificial graphite particles are, however, generally expensive and low in crystallinity. Artificial graphite produced so as to have a high crystallinity is close to natural graphite in properties. Accordingly, the graphite particles obtained by grinding an artificial graphite of high crystallinity has a scaly or complex shape, similarly to natural graphite.

The negative electrode of lithium ion secondary battery is generally constituted by a collector (e.g. copper foil) and a thin graphite layer formed on the surface of the collector.

The graphite layer is preferred to have a high density in order to allow the lithium ion secondary battery to have large charge and discharge capacities. Ordinarily, the high density is achieved by compressing the graphite layer formed on the surface of the collector, by pressing, rolling, etc.

However, when the graphite layer of natural graphite particles or highly crystalline artificial graphite particles is compressed by pressing or rolling, the graphite particles undergo a compressive force and the planes (AB planes) of graphite particles are orientated so as to be in parallel to the compression plane. This is caused because the graphite particles have a thin scaly shape.

That is, individual scaly graphite particles constituting the graphite layer tend to be orientated so that each AB plane becomes parallel to the surface of the collector. Such orientation of graphite particles in molded material (e.g. graphite layer) is hereinafter referred to simply as "orientation".

Orientation of graphite particles is not preferable in the graphite layer constituting the negative electrode of battery. The orientation of graphite particles occurring on the surface of electrode by pressing makes difficult the infiltration of electrolytic solution into the graphite layer of electrode. As a result, the site of contact between graphite and electrolytic solution is restricted to around the surface of graphite layer, inviting the reduction in power generation ability of battery.

In the graphite layer of battery, electricity flows to the thickness direction of graphite layer. This thickness direction agrees with the C axis direction of the graphite particles orientated in the graphite layer. The conductivity of graphite crystal is large in the AB plane direction and small in the C axis direction. For this reason, when graphite particles are orientated, the graphite layer has a large electric resistance, resulting in a small charge and discharge capacity of battery.

Meanwhile, artificial graphite particles of low crystallinity are low in orientation but is small in charge and discharge capacities per unit mass. Accordingly, it is not preferred to use such artificial graphite particles as a negative electrode material of lithium ion secondary battery.

Other conventional graphite electrodes also have, in many cases, the above-mentioned orientation problem of graphite particles.

The present inventors proposed a method for producing primary spheroidized graphite particles in order to obtain highly crystalline graphite particles low in anisotropy caused by crystal structure (Patent Literature 1).

In order to produce a negative electrode material of low anisotropy using primary spheroidized graphite particles, there was disclosed a method of kneading primary spheroidized graphite particles and a graphitizable binder (e.g. pitch), subjecting the kneaded material to pressure molding, firing the pressure-molded material, and graphitizing the fired material (Patent Literature 2). In this method, high-temperature firing of 2,800° C. is conducted in the final graphitization step. Such high-temperature firing, however, involves various problems in production, unlike in low-temperature firing.

PRIOR ART LITERATURES

Patent Literatures
  Patent Literature 1: U.S. Pat. No. 4,065,136 (Claim 1)
  Patent Literature 2: WO 2008/084675 (Claims)

SUMMARY OF INVENTION

Technical Problem

The aim of the present invention lies in providing a negative electrode material for lithium ion secondary batteries (hereinafter, this may be referred to simply as negative electrode material) which is low in anisotropy caused by the crystal structure, high in charge and discharge capacities when incorporated in battery, and superior in life. The aim of the present invention lies also in providing a method for producing a negative electrode material for lithium ion secondary batteries, at a high yield, stably and in a large amount.

Solution to Problem

The present inventors made a research and thought of mixing of primary spheroidized graphite particles and a phenolic resin, then pressure-molding of the resulting mixture. Mixing of primary spheroidized graphite particles and a phenolic resin, granulation of the mixture to form secondary particles, pressure-molding of the secondary particles, and subsequent disintegration enable the consolidation of primary spheroidized graphite particles without giving rise to anisotropy and the production of disintegrated particles. Firing of the disintegrated particles to carbonize the phenolic resin of high carbon residue ratio can form fired particles of low porosity. CVD of these fired particles can produce graphite particles which are extremely inactive, high in charge and discharge capacity, and suited for production of negative electrode.

In the above, the firing temperature and the CVD temperature may be far lower than graphitization temperature, which poses no problem in the steps. The thus-obtained graphite particles are highly preferred as a negative electrode material for lithium ion secondary batteries, as mentioned later.

The present invention, which has achieved the above-mentioned task, is described below.

[1] A negative electrode material for lithium ion secondary batteries, which comprising:

amorphous coated particles which are composed of a plurality of consolidated particles having no specific shape, obtained by consolidating a plurality of primary spheroidized graphite particles and 0.5 to 20% by mass of an amorphous carbon layer coating the surfaces of the consolidated particles and bonding the consolidated particles with each other, and 0.5 to 25% by mass of a highly crystalline carbon layer having an interplanar spacing of 0.335 nm to less than 0.3369 nm, formed by a CVD so as to cover the outer surfaces of the amorphous coated particles, and which is also characterized by having a porosity of 5% by volume or less.

[2] The negative electrode material for lithium ion secondary batteries, set forth in [1], wherein the porosity is 0.5 to 4.1% by volume.

[3] The negative electrode material for lithium ion secondary batteries, set forth in [1], which has a bulk density of 0.4 to 0.9 g/ml.

[4] The negative electrode material for lithium ion secondary batteries, set forth in [1], which has a tap density of 0.7 to 1.3 g/ml.

[5] The negative electrode material for lithium ion secondary batteries, set forth in [1], wherein the consolidated particles have an average particle diameter of 5 to 40 μm.

[6] The negative electrode material for lithium ion secondary batteries, set forth in [1], wherein the number of the consolidated particles is 3 to 50.

[7] The negative electrode material for lithium ion secondary batteries, set forth in [1], wherein the amorphous carbon layer has a thickness of 0.05 to 2 μm.

[8] The negative electrode material for lithium ion secondary batteries, set forth in [1], wherein the highly crystalline carbon layer has a thickness of 0.05 to 2 μm.

[9] A method for producing a negative electrode material for lithium ion secondary batteries set forth in [1], which comprising the following steps:

(1) a granulation step of subjecting a slurry containing primary spheroidized graphite particles of 5 to 40 μm in average particle diameter and a phenolic resin, to produce secondary particles of 10 to 200 μm in average particle diameter, (2) a step of subjecting the secondary particles to pressure molding at 5 to 50 kN to produce a molded material of secondary particles, (3) a disintegration step of disintegrating the molded material of secondary particles to obtain disintegrated particles of 10 to 50 μm in average particle diameter, (4) a firing step of heating the disintegrated particles in an inert gas atmosphere at 800 to 1,500° C. for 0.5 to 10 hours to obtain fired particles, and (5) a CVD step of subjecting the fired particles to a CVD in a fluidized bed to form highly crystalline carbon on the surfaces of the fired particles.

[10] A negative electrode for lithium ion secondary batteries, which incorporates a negative electrode material for lithium ion secondary batteries set forth in [1].

[11] A lithium ion secondary battery which incorporates the negative electrode set forth in [10].

Advantageous Effect of the Invention

The negative electrode material for lithium ion secondary batteries, of the present invention is produced using primary spheroidized graphite particles as a raw material. Therefore, the negative electrode material of the present invention is low in anisotropy of graphite crystal. The negative electrode material of the present invention is produced by consolidating primary spheroidized graphite particles. Therefore, in the negative electrode produced using the present negative electrode material, the filing density of graphite is high. As a result, the lithium ion secondary battery produced using the negative electrode has a high capacity.

Further, in the present negative electrode material, the consolidated primary spheroidized graphite particles are bonded by amorphous carbon and, accordingly, the consolidated particles are hard. Therefore, in producing a negative electrode, the deformation of particles in pressure molding is small and orientation takes place hardly. As a result, in the negative electrode obtained, there is no anisotropy with respect to conductivity and the infiltrability of electrolytic solution is high. Consequently, the lithium ion secondary battery produced using the present negative electrode material has high charge and discharge capacities.

The present negative electrode material is covered with a highly crystalline carbon layer at the outer surface and accordingly has a small specific surface area. Therefore, the present negative electrode material causes little reaction with electrolytic solution. Accordingly, the lithium ion secondary battery produced with the present negative electrode material is low in the deterioration of electrolytic solution and has a long life.

BRIEF DESCRIPTION OF DRAWINGS

In FIG. 2, FIG. 2(a) is a microscopic photograph of the negative electrode material produced in Example 1, and FIG. 2(b) is a microscopic photograph of a section of the negative electrode material.

In FIG. 3, FIG. 3(a) is a microscopic photograph of the negative electrode material produced in Comparative Example 1, and FIG. 3(b) is a microscopic photograph of a section of the negative electrode material.

FIG. 4, FIG. 4(a) is a microscopic photograph of the negative electrode material produced in Comparative Example 3, and FIG. 4(b) is a microscopic photograph of a section of the negative electrode material.

REFERENCE SIGNS LIST

Figure 1:
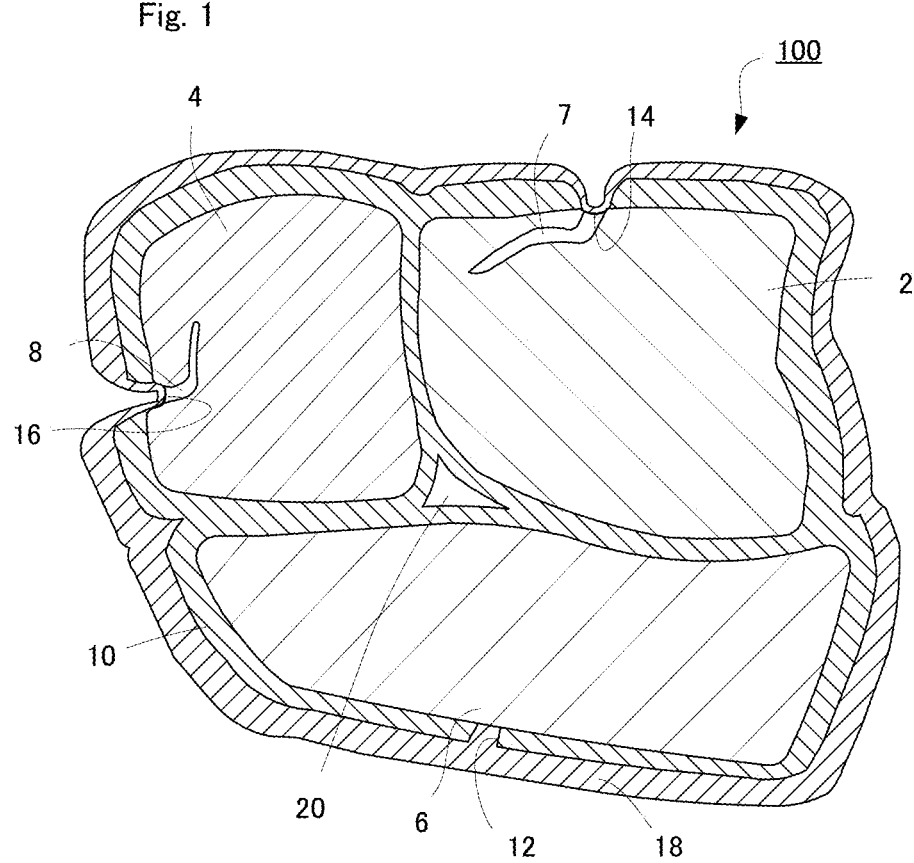
FIG. 1 is a drawing showing an example of the negative electrode material of the present invention.

100: a negative electrode material for lithium ion secondary battery 2, 4, 6: each a consolidated particle 7, 8: each a pore
10: an amorphous carbon layer
12: a pinhole
14, 16: each an opening
18: a highly crystalline carbon layer
20: a gap between particles

DESCRIPTION OF EMBODIMENTS

The present invention is described in detail below.
(Negative Electrode Material for Lithium Ion Secondary Batteries)

FIG. 1 is an explanatory drawing showing an example of the negative electrode material for lithium ion secondary batteries, of the present invention.

In FIG. 1, 100 is a negative electrode material for lithium ion secondary batteries of the present invention (hereinafter, the material may be abbreviated as the present negative electrode material). 2, 4 and 6 are each a consolidated particle composed of a graphite particle and have no specific shape. The consolidated particles 2, 4 and 6 are formed by, in the production steps of the present negative electrode material, pressurization and consolidation of spheroidized graphite particles (raw material) and resultant plastic deformation and have no specific shape. The consolidation is explained in detail in the production steps described later.

The consolidated particles 2, 4 and 6 each have inside a layer structure in which AB planes are laminated in a large number of layers. The layer structure has a crystal structure of graphite and the interplanar spacing thereof is kept at 0.335 to 0.3369 nm. This layer structure of graphite is complicated. The consolidated particles 2, 4 and 6 have, inside, a layer structure such as structure of a large number of linearly extending layers, folded layer structure, bent layer structure and the like. Pores 7, 8 and 20 formed between the gaps of these layer structures are small in number as described later.

The consolidated particles 2, 4 and 6 have an average particle diameter of 5 to 40 μm, more preferably 10 to 20 μm.

The primary spheroidized graphite particles (raw material) are produced by folding scaly graphite particles to give rise to spheroidization. In this production step, pores are formed inside the primary spheroidized graphite particles but are decreased considerably in the consolidation. However, the pores do not disappear completely and remain as pores 7 and 8 inside the consolidated particles 2 and 4 of indefinite shape. Inside the consolidated particle 6, there is nearly no pore.

The outer surfaces of the consolidated particles 2, 4 and 6 are covered with an amorphous carbon layer 10. As described later, this amorphous carbon layer 10 is formed, in a firing step, by carbonization of phenolic resin and is composed of amorphous carbon. The amorphous carbon layer 10 has a thickness of preferably 0.05 to 2 μm, more preferably 0.2 to 1 μm. The amorphous carbon layer and a highly crystalline carbon layer (described later) can be distinguished by examining the X-ray diffraction pattern. The thickness of the amorphous carbon layer 10 can be determined by observing the section of negative electrode material by a transmission electron microscope. The content of the amorphous carbon layer is preferably 0.5 to 20% by mass based on the mass of the present negative electrode material 100.

The consolidated particles 2, 4 and 6 are covered incompletely with the amorphous carbon layer 10, at the outer surfaces. A pinhole 12, cracks (not shown), openings 14 and 16 of pores 7 and 8, etc. are not covered with the amorphous carbon layer 10. Therefore, the consolidated particles 2, 4 and 6 are exposed at these sites.

18 is a highly crystalline carbon layer and is formed so as to tightly adhere to the outer surface of the amorphous carbon layer 10. The pinhole of amorphous carbon layer 10, the openings 14 and 16 of pores 7 and 8, etc. are covered completely with the highly crystalline carbon layer 18. Accordingly, the consolidated particles 2, 4 and 6 and the outside of the present negative electrode material 100 are completely isolated from each other by the highly crystalline layer 18. The highly crystalline carbon layer 18 is formed by CVD as described later.

The highly crystalline carbon layer 18 has a thickness of preferably 0.05 to 2 μm, more preferably 0.2 to 1 μm. The thickness of the highly crystalline carbon layer can be determined by observing the section of the negative electrode material using a transmission electron microscope. The highly crystalline carbon layer 18 has an interplanar spacing of 0.335 to 0.3369 nm. The interplanar spacing can be determined by measuring the crystal peak of 26.4° using an X-ray diffractometer.

The content of the highly crystalline carbon layer is preferably 0.5 to 20% by mass based on the mass of the present negative electrode material 100.

Incidentally, 20 is a gap between particles and remains between the consolidated particles 2, 4 and 6 in the pressure molding step. The proportion (porosity) of the total volume of the volume of pores 7 and 8 and the volume of gap 20 between particles is ordinarily 5% by volume or less, preferably 0.5 to 4.1% by volume based on the volume of the present negative electrode material.

The present negative electrode material 100 has a bulk density of 0.4 to 0.9 g/ml, preferably 0.5 to 0.8 g/ml.

The present negative electrode material 100 has a tap density of 0.7 to 1.3 g/ml, preferably 1 to 1.3 g/ml.

The present negative electrode material 100 contains 3 to 50 consolidated particles, preferably 3 to 40 consolidated particles, more preferably, 4 to 20 consolidated particles, further preferably 6 to 18 consolidated particles.
(Method for Producing Negative Electrode Material for Lithium Ion Secondary Batteries)

The present negative electrode material is preferably produced via the following steps (1) to (5).

In the method for producing the negative electrode material of the present invention, a starting material is primary spheroidized graphite particles obtained by spheroidization. Any graphite particles may be used as long as they are spheroidized. By using primary spheroidized graphite particles as a raw material, there are obtained secondary particles (an aggregate of a plurality of primary spheroidized graphite particles) in a granulation step (described later) and a shaped material of secondary particles in a production step of shaped material, which are restricted in shape and, with respect to conductivity, in anisotropy. That is, the secondary particles and the shaped material of secondary particles have no scaly shape unlike the graphite particles and show no anisotropy in conductivity.

The primary spheroidized graphite particles have an average particle diameter of preferably 5 to 40 μm, more preferably 10 to 20 μm and an aspect ratio of preferably 1 to 4, more preferably 1 to 2. Such primary spheroidized graphite particles can be obtained, for example, by the above-mentioned production method described in Japanese Patent No. 4065136.

The production method uses an apparatus having, inside the casing, an impact member rotating at a high speed around the axis center. Scaly graphite particles (raw material) are fed into the apparatus from outside the rotational locus of the impact member, together with air, and primary spheroidized graphite particles are taken out from inside the rotational locus. The primary spheroidized graphite particles obtained have inside a lamination structure of bent graphite. This lamination structure is formed by lamination of AB planes of graphite.

As the graphite particles (raw material), there can also be used primary spheroidized graphite particles produced by the method described in [0082] of WO 2008/84675. A product on the market can also be used.

As mentioned above, the primary spheroidized graphite particles (raw material) are ordinarily produced by folding and spheroidizing scaly graphite particles. In this production process, pores are formed inside the primary spheroidized graphite particles. The porosity of the primary spheroidized graphite particles is ordinarily about 30% by volume.

(1) Granulation Step

In the granulation step, there is first produced a slurry containing primary spheroidized graphite particles (raw material), a phenolic resin and a solvent, ordinary at a room temperature.

As the phenolic resin, a phenolic resin soluble in methanol or water can be used. A water-soluble phenolic resin is preferred. A resole or novolac type can be used as the phenolic resin. The phenolic resin has an average molecular weight of preferably 200 to 5,000, more preferably 400 to 4,000.

The solvent is preferably methanol, water or the like. Water is most preferred as the slurry solvent, in view of the safety, etc.

As to the mixing proportions of the primary spheroidized graphite particles (raw material) and the phenolic resin, the phenolic resin is preferably 0.5 to 30 mass parts (as dried), more preferably 2 to 20 mass parts, more preferably 5 to 15 mass parts, relative to 100 mass parts of the primary spheroidized graphite particles.

The concentration of the primary spheroidized graphite particles in the slurry is preferably 10 to 55% by mass, preferably 20 to 50% by mass, more preferably 25 to 45% by mass.

The above-produced slurry is subjected to granulation in the present granulation step, whereby secondary particles of 10 to 200 µm, preferably 20 to 100 µm in average particle diameter are produced. Each secondary particle is an agglomerate of about 2 to 20 primary spheroidized graphite particles. Any desired granulation method can be used for the granulation. Granulation by spray drier is preferred. The operating conditions of the spray drier may be known conditions.

Then, the secondary particles are preferably dried for removal of the solvent used in the preparation of the slurry. Granulation by Henschel mixer may also be used.

(2) Production Step of Molded Material of Secondary Particles

In this step, the secondary particles produced in the above granulation step are pressure-molded. With this pressure molding, a plurality of consolidated particles are integrated by the phenolic resin, whereby a molded material of secondary particles is produced.

The molding pressure is preferably 5 kN to 50 kN, more preferably 10 to 40 kN, particularly preferably 15 to 30 kN. In the pressure molding, there can be preferably used, for example, a general-use press on the market, an extruder, a compactor, a briquetting machine, a pelletizer, a CIP molding machine and a tabletting machine.

By the pressure molding, each primary spheroidized graphite particle is consolidated while undergoing plastic deformation and becomes a graphite particle having no specific shape (a consolidated particle). Further, with this consolidation, the pores inside each primary spheroidized graphite particle decrease and become a pore 7 or 8. Furthermore, the plastic deformation in each consolidated particle acts to decrease the gaps between primary spheroidized graphite particles. As a result, in the resulting shaped material of secondary particles, the consolidated particles 2, 4 and 6 adhere tightly to each other via the phenolic resin and the gap 20 between consolidated particles is less than before the pressure molding.

Owing to the pressure molding, the porosity of about 30% by volume, of the primary spheroidized graphite particles before the pressure molding decreases to 5% by volume or smaller, preferably 0.5 to 4% by volume. The porosity of the shaped material of secondary particles (the porosity of consolidated particles and the porosity between consolidated particles) decreases to 5% by volume or smaller, preferably 0.5 to 4% by volume, more preferably 1 to 3% by volume.

The porosity of each particle is determined by the following method. First, each particle is cut and the electron micrograph of the cut section is taken. Then, the image analysis of pores is made using the photograph of the cut section obtained and the porosity of particle is calculated.

(3) Disintegration Step

The molded material of secondary particles, produced in the above step is disintegrated in this disintegration step to produce disintegrated particles having no specific shape. By the disintegration, the molded material of secondary particles is disintegrated along the phenolic resin present between the consolidated particles. The consolidated particles per se are not substantially disintegrated.

In the disintegration, any desired grinder can be used. There can be mentioned, for example, a hammer mill, a jaw crusher, a pin mill, and a jet mill.

The average particle diameter of the disintegrated particles is preferably 10 to 50 µm, more preferably 15 to 30 µm. The disintegrated particles each contain 3 to 50 consolidated particles, preferably 3 to 40 consolidated particles, more preferably 4 to 20 consolidated particles.

(4) Firing Step

By the present firing step, the disintegrated particles are fired and the phenolic resin of the disintegrated particles is carbonized. As a result, there can be obtained fired particles which are each composed of a plurality (preferably 3 to 50) of consolidated particles covered with an amorphous carbon layer and integrated into one piece.

The fired particles have a porosity of 5% by volume or smaller, preferably 4 to 0.5% by volume. Here, the porosity refers to a porosity of the total of the pores 7 and 8 inside consolidated particles and the gap 20 between consolidated particles.

The firing is conducted in an inert gas atmosphere such as nitrogen, helium, argon or the like.

The firing temperature is preferably 800 to 1,500° C., more preferably 850 to 1,100° C. When the firing temperature is lower than 800° C., the carbonization of the phenolic resin takes a long time. When the firing temperature exceeds 1,500° C., there is no particular problem but such a firing temperature is uneconomical.

The firing time is preferably 0.5 to 10 hours, more preferably 1 to 5 hours. When the firing time is shorter than 0.5 hour, the carbonization of the phenolic resin is insufficient and the negative electrode material obtained has a high electric resistance and a low mechanical strength. When the firing time exceeds 10 hours, there is no particular problem but such a firing time is uneconomical.

The firing is preferably conducted using a firing furnace, a rotary kiln, or the like.

(5) CVD Step

The fired particles produced in the above firing step (4) are subjected to chemical vapor deposition (CVD) and the present negative electrode material is obtained. By the CVD, the surfaces of the fired particles are completely covered with a highly crystalline carbon layer 18 having an interplanar spacing of 0.335 nm to less than 0.3369 nm and the amorphous carbon layer 10 is isolated from outside.

In the present invention, the CVD is a treatment in which the vapor of an organic substance is introduced into an inert gas atmosphere (wherein the fired particles are being heated), is allowed to contact with the surfaces of the fired particles, and is decomposed thermally and the carbon generated is deposited on the surfaces of the fired particles. The CVD has a feature that the graphite particles as a nucleus can be completely covered with a small amount of a highly crystalline carbon layer.

The highly crystalline carbon layer, when present in a battery, can prevent the decomposition of the solvent of electrolytic solution. For example, when the content of polycarbonate in the solvent of electrolytic solution is 50% by volume or smaller, the decomposition of the electrolytic solution during charge can be prevented completely.

The covering amount of the highly crystalline carbon layer is preferably 0.5 to 25% by mass, more preferably 2 to 20% by mass, most preferably 5 to 15% by mass based on the mass of the present negative electrode material. When the covering amount of the highly crystalline carbon layer is 0.5% by mass or more, the decomposition of the solvent of electrolytic solution during charge can be prevented. When there is produced, using a CVD apparatus, a negative electrode material covered with a highly crystalline carbon layer of more than 25% by mass, the production step is unstable. A battery produced using a negative electrode material obtained via such an unstable step is not preferred because the battery shows, for example, a dispersion in charge and discharge amounts. The temperature of CVD is preferably 800 to 1,500° C., more preferably 800 to 1,200° C., more preferably 850 to 1,100° C. When the CVD temperature is lower than 800° C., the deposition rate of highly crystalline carbon is small and the time needed for CVD is long. Further, the highly crystalline carbon generated has a high electric resistance, resulting in a low efficiency of initial discharge and a low efficiency of initial discharge of battery.

As the CVD temperature is higher, the conversion rate of organic substance vapor into carbon is higher. However, the carbon deposited on the surfaces of the fired particles does not grow in a filmy state but in a fibrous state. Accordingly, a high CVD temperature is not preferred when the CVD aims at surface coverage.

As the organic substance as a source of thermally decomposed carbon, used in the CVD, there can be mentioned benzene, toluene, xylene, styrene, ethylbenzene, diphenylmethane, diphenyl, naphthalene, phenol, cresol, nitrobenzene, chlorobenzene, indene, coumarone, pyridine, anthracene, phenanthrene, and a mixture thereof.

There can further be mentioned gas light oil obtained in tar distillation, creosote oil, anthracene oil, tar oil obtained in naphtha cracking, etc.

There can further be mentioned aliphatic hydrocarbons such as methane, ethane, propane, butane, pentane, hexane and the like; and a mixture thereof.

There can further be mentioned unsaturated hydrocarbons such as acetylene, ethylene, propylene, isopropylene, butadiene and the like. Incidentally, when a chlorine compound such as trichloroethylene, dichloroethylene or the like is used, the CVD temperature may be lowered to 700 to 800° C.

The negative electrode material for lithium ion secondary batteries, of the present invention is produced preferably via the above steps (1) to (5).

(Production of Negative Electrode)

With respect to the method for producing a negative electrode for lithium ion secondary batteries using the negative electrode material for lithium ion secondary batteries, of the present invention, there is no particular restriction. For example, a binder and a solvent are added to the present negative electrode material, followed by sufficient kneading, to obtain a slurry. Then, the slurry is pressure-bonded to a collector made of a metal foil, a metal mesh or the like, whereby a negative electrode can be produced.

A known material can be used as the binder. There can be used, for example, various pitches and a polytetrafluoroethylene. A polyvinylidene fluoride (PVDF) or an ethylene-propylene-diene polymer (EPDM) is preferred particularly.

There is no particular restriction as to the positive electrode material. A conventionally used positive electrode material can be used. There is preferred, for example, a lithium-containing compound such as $LiCoO_2$, $LiNiO_2$, $LiMn_2O_4$ or the like. A positive electrode material of powdery state is kneaded as necessary with a binder, an electroconductive material, a solvent, etc. and the kneaded material is molded together with a collector, whereby a positive electrode material can be produced.

As the electrolytic solution of lithium ion secondary battery, an aprotic non-aqueous solvent of low dielectric constant which can dissolve a lithium salt is preferred. The electrolytic solution per se is known.

As the solvent for electrolytic solution, there can be mentioned, for example, ethylene carbonate (hereinafter abbreviated as EC), dimethyl carbonate (hereinafter abbreviated as DMC), methyl ethyl carbonate (hereinafter abbreviated as MEC), propylene carbonate, diethylene carbonate, acetonitrile, propionitrile, tetrahydrofuran, γ-butyrolactone, 2-methyltetrahydrofuran, 1,3-dioxorane, 4-methyl-1,3-dioxorane, 1,2-dimethoxyethane, 1,2-diethoxyethane, diethyl ether, sulfolane, methylsulfolane, nitromethane, N,N-dimethylformamide, and dimethyl sulfoxide. These solvents can be used singly or in admixture of two or more kinds.

As the lithium salt used as the electrolyte of lithium ion secondary battery, there can be mentioned, for example, $LiClO_4$, $LiAsF_6$, $LiPF_6$, $LiBF_4$, $LiB(C_6H_5)_4$, LiCl, LiBr, $CH_3SO_3Li$ and $CF_3SO_3Li$. These salts can be used singly or in admixture of two or more kinds.

The present invention is described in detail below by way of Examples. Properties were measured by the following methods.

[Tap Density]

A sample was placed in a 100-ml glass-made, graduated cylinder and tapped. The volume of the sample was measured when there was no change in the sample volume in the graduated cylinder. The sample mass was divided by the volume of the sample and the value obtained was taken as the tap density of the sample.

[Average Particle Diameter]

The average particle diameter of a sample was measured using a laser diffraction particle size tester SALD 200 V produced by Shimadzu Corporation.

[External Shape]

The external shape of a sample was observed using a 3D real surface view microscope Model VE-9800 produced by KEYENCE CORPORATION.

[Internal Structure of Particle]

A sample buried in a polyester resin was polished by a given method. The polished surface was coated with Au in a thin layer, to obtain a measurement sample. The measurement sample was observed using a scanning electron microscope (SEM) produced by JOEL Ltd. or a 3D real surface view microscope Model VE-9800 produced by KEYENCE CORPORATION.

[Content of Amorphous Carbon]

The content of an amorphous carbon layer was measured by a weight decrease method, using a thermogravimetric analyzer TGA 50 produced by Shimadzu Corporation. That is, the temperature of a sample was increased in an oxidizing atmosphere and the area of the exothermic peak obtained, of the amorphous carbon layer was measured. Then, the content of the amorphous carbon layer was calculated using the measurement value.

[Content of Highly Crystalline Carbon Layer]

The content of a highly crystalline carbon layer formed by CVD can be measured using a Li-NMR. In using a Li-NMR, the content of the highly crystalline carbon layer can be determined from the peak position and the peak area ratio. Highly crystalline carbon has a peak at 10 to 20 ppm, graphite carbon has a peak at 40 to 50 ppm, and phenol-derived carbon has a peak at 30 to 120 ppm.

The total content of the highly crystalline carbon layer and the consolidated particles was calculated by subtracting the mass of amorphous carbon from the total mass.

[Primary Spheroidized Graphite Particles]

The primary spheroidized graphite particles, which are a raw material for the present negative electrode material, were produced by the method described in JP-A-2002-367611. The primary spheroidized graphite particles had an average particle diameter of 25 μm, a tap density of 1.0 g/ml, an average aspect ratio of 1.3, a porosity of 32% by volume and a specific surface area of 4.6 m$^2$/g.

Example 1

To 95 mass parts of primary spheroidized graphite particles of 25 μm in average particle diameter was added 7 mass parts of a general-use phenolic resin (trade name: Resipop), a product of Gun-Ei Chemical Industry Co., Ltd., solid content: 70% by mass). Further, 150 mass parts of methanol was added to obtain a slurry (slurry concentration: 40% by mass). The slurry was subjected to granulation using a spray drier provided with an atomizer nozzle, to obtain secondary particles having an average particle diameter of 45 μm.

The secondary particles were pressure-molded at 19 kN using a hand press to obtain a tablet-shaped molded material of secondary particles, of 12 mm in diameter and 5 mm in thickness. The molded material was disintegrated using a pin mill. The disintegrated particles were classified using a vibrating screen having an opening of 53 μm. This operation was repeated three times to obtain 1 kg of disintegrated particles of 92% in undersize yield and 32μ in average particle diameter.

The disintegrated particles were fired in a nitrogen atmosphere in a fluidized reactor in a fluidized state, at 900° C. for 1 hour, to obtain fired particles. During the firing, nitrogen gas was fed into the fluidized reactor at 1 liter/min.

Then, a nitrogen gas containing 1 g/min (ok ?) of benzene was introduced into the fluidized reactor at 1 liter/min and the fired particles were subjected to CVD in a fluidized state at 900° C. for 1 hour, to obtain a negative electrode material for lithium ion secondary batteries, having an average particle diameter of 32 μm and a specific surface area of 1.1 m$^2$/g. The amount of a highly crystalline carbon layer adhered by CVD was 6% by mass based on the mass of the negative electrode material.

The micrograph of the negative electrode material obtained is shown in FIG. 2. The production conditions of the negative electrode material are summarized in Table 1.

A lithium ion secondary battery was produced using the negative electrode material obtained. First, a binder, the carbon particles and a solvent were mixed to obtain a slurry. This slurry was coated on a copper foil, followed by drying and pressure bonding, to obtain a negative electrode. The thickness of the carbon particle layer formed on the copper foil was 60 μm.

A lithium ion secondary battery was produced using this negative electrode. Using the battery, an evaluation test for the negative electrode material for lithium ion secondary batteries was conducted. The results of the evaluation test are shown in Table 3.

The constitution of the lithium ion secondary battery and the conditions of the evaluation test are shown below.

Cell: 2 electrodes (reference electrode: metallic lithium)
Negative electrode material amount in negative electrode: 20 mg
Area of negative electrode: 2.0 cm$^2$
Binder: PVDF 7% by mass (based on the mass of negative electrode material)
Solvent used for preparation of negative electrode material slurry: 1-methyl-2-pyrrolidone
Drying conditions: 130° C. and 5 hours (in vacuum)
Electrolyte, concentration: LiPF$_6$, 1 mol/liter
Electrolytic solution solvent/composition: EC/DMC=1/2 (vol)
During charge at constant current
Current: 1 mA
Current density: 0.4 mA/cm$^2$
During charge at constant voltage
Voltage: 1 mV
Time: 1 hr
Measurement range of discharge capacity: 1 mV to 1.5 V The present invention is described further referring to Examples.

Examples 2 and 3

Operations were conducted in the same manner as in Example 1 except that production conditions shown in Table 1 were used. The results are summarized in Tables 2 to 4.

Comparative Example 1

Only spheroidized graphite particles having an average particle diameter of 26 μm were pressure-molded at 19 kN without adding a phenolic resin. Subsequent operations were conducted in the same manner as in Example 1, to obtain a negative electrode material having an average particle diameter of 26 μm and a specific surface area of 2.4 m$^2$/g. The results are shown in Tables 2 to 4.

Comparative Examples 2 and 3

Operations were conducted in the same manner as in Example 1 except that the operating conditions shown in Table 1 were used. The results are shown in Tables 2 to 4. In Comparative Example 2, the phenolic resin was used in a large amount (50% by mass). In Comparative Example 3, the pressure molding step of secondary particles was omitted.

As shown in Table 3, there was no big difference between Examples and Comparative Examples, in the initial charge and discharge efficiencies; however, as shown in Table 4, as the charge and discharge times become large (500 cycles), the lithium ion secondary batteries using the negative electrode materials of Examples showed capacity retentions of 70% or higher while the lithium ion secondary batteries using the negative electrode materials of Comparative Examples showed low capacity retentions of 35 to 58%.

TABLE 1

Production conditions of negative electrode materials

| | Example 1 | Example 2 | Example 3 | Example 4 | Comparative Example 1 | Comparative Example 2 | Comparative Example 3 |
|---|---|---|---|---|---|---|---|
| Phenolic resin (mass %) | 5 | 30 | 15 | 5 | 0 | 50 | 5 |
| Average particle diameter of secondary particles (μm) | 45 | 88 | 63 | 45 | 26 | 250 | 60 |
| Molding pressure (kN) | 19 | 19 | 19 | 8 | 19 | 19 | 0 |
| Average particle diameter of disintegrated particles (μm) | 32 | 39 | 36 | 31 | 26 | 45 | 35 |
| Firing temperature (° C.) | 900 | 900 | 900 | 900 | 900 | 900 | 900 |
| CVD temperature (° C.) | 900 | 900 | 900 | 900 | 900 | 900 | 900 |
| CVD time (h) | 1 | 1 | 1 | 1 | 1 | 1 | 1 |

TABLE 2

Properties of negative electrode materials

| | Example 1 | Example 2 | Example 3 | Example 4 | Comparative Example 1 | Comparative Example 2 | Comparative Example 3 |
|---|---|---|---|---|---|---|---|
| Amorphous carbon layer (mass %) | 2 | 12 | 5 | 2 | 0 | 25 | 2 |
| Highly crystalline carbon layer (mass %) | 6 | 6 | 6 | 6 | 6 | 6 | 6 |
| Particle diameter distribution of negative electrode material, $D_{90}$ (μm) | 54 | 62 | 58 | 54 | 47 | 66 | 54 |
| Particle diameter distribution of negative electrode material, $D_{50}$ (μm) | 32 | 39 | 36 | 32 | 28 | 45 | 34 |
| Particle diameter distribution of negative electrode material, $D_{10}$ (μm) | 19 | 23 | 21 | 19 | 19 | 24 | 20 |
| Specific surface area of negative electrode material (m$^2$/g) | 1.1 | 0.6 | 0.9 | 1.6 | 2.5 | 1.1 | 2.6 |
| Porosity (vol. %) | 2 | 3 | 1 | 5 | | 3 | 23 |
| Tap density (g/ml) | 1.1 | 1.1 | 1.2 | 1.1 | 1.1 | 0.8 | 0.9 |

TABLE 3

Initial properties of lithium ion secondary batteries

| | Negative electrode material | | | | | | |
|---|---|---|---|---|---|---|---|
| | Example 1 | Example 2 | Example 3 | Example 4 | Comparative Example 1 | Comparative Example 2 | Comparative Example 3 |
| Charge capacity (mAh/g) | 388 | 389 | 389 | 388 | 385 | 388 | 394 |

TABLE 3-continued

Initial properties of lithium ion secondary batteries

| | Negative electrode material | | | | | | |
|---|---|---|---|---|---|---|---|
| | Example 1 | Example 2 | Example 3 | Example 4 | Comparative Example 1 | Comparative Example 2 | Comparative Example 3 |
| Discharge capacity (mAh/g) | 354 | 345 | 350 | 354 | 362 | 322 | 354 |
| Efficiency (%) | 91.2 | 88.7 | 90.0 | 91.2 | 94.0 | 82.7 | 89.8 | d (electrode density) = 1.6 g/ml, binder: CMC 1% + LX 1%, electrolytic solution: 1M LiPF$_6$, solvent: EC/DMC = 1/2 (vol. %)

TABLE 4

Life characteristics of lithium ion secondary batteries (60° C.)

| | Example 1 | Example 2 | Example 3 | Example 4 | Comparative Example 1 | Comparative Example 2 | Comparative Example 3 |
|---|---|---|---|---|---|---|---|
| Capacity retention at 100 cycles (%) | 88 | 90 | 90 | 88 | 83 | 88 | 85 |
| Capacity retention at 200 cycles (%) | 83 | 84 | 82 | 81 | 68 | 73 | 70 |
| Capacity retention at 500 cycles (%) | 72 | 74 | 75 | 70 | 35 | 45 | 58 | d (electrode density) = 1.6 g/ml, binder: CMC 1% + LX 1%, electrolytic solution: 1M LiPF$_6$, solvent: EC/DMC = 1/2 (based on volume), positive electrode: Li

TABLE 5

Discharge rate characteristics at room temperature (unit in Table: %)

| Discharge characteristic (times) | Negative electrode material | | | | | | |
|---|---|---|---|---|---|---|---|
| | Example 1 | Example 2 | Example 3 | Example 4 | Comparative Example 1 | Comparative Example 2 | Comparative Example 3 |
| 1 | 99.5 | 99.4 | 99.5 | 99.5 | 99.9 | 97.5 | 99.5 |
| 2 | 99.0 | 99.1 | 99.1 | 99.0 | 99.0 | 97.0 | 99.1 |
| 2.5 | 98.1 | 98.0 | 98.2 | 98.2 | 97.7 | 95.1 | 98.3 |
| 3 | 96.9 | 96.2 | 96.5 | 97.2 | 94.2 | 91.9 | 96.3 | d (electrode density) = 1.6 g/ml, binder: CMC 1% + LX 1%, electrolytic solution: 1M LiPF$_6$, solvent: EC/DMC = 1/2 (based on volume), positive electrode: Li

We claim:

1. A negative electrode material for lithium ion secondary batteries comprising:

amorphous coated particles which are composed of a plurality of consolidated particles having no specific shape, obtained by consolidating a plurality of primary spheroidized graphite particles and 0.5 to 20% by mass of an amorphous carbon layer coating the surfaces of the consolidated particles and bonding the consolidated particles with each other, wherein the amorphous carbon layer has a thickness of 0.05 to 2 μm, and 0.5 to 25% by mass of a highly crystalline carbon layer having an interplanar spacing of 0.335 nm to less than 0.3369 nm, formed by a CVD so as to cover the outer surfaces of the amorphous coated particles, and which is also characterized by having a porosity of 5% by volume or less.

2. The negative electrode material for lithium ion secondary batteries, set forth in claim 1, wherein the porosity is 0.5 to 4.1% by volume.

3. The negative electrode material for lithium ion secondary batteries, set forth in claim 1, which has a bulk density of 0.4 to 0.9 g/ml.

4. The negative electrode material for lithium ion secondary batteries, set forth in claim 1, which has a tap density of 0.7 to 1.3 g/ml.

5. The negative electrode material for lithium ion secondary batteries, set forth in claim 1, wherein the consolidated particles have an average particle diameter of 5 to 40 μm.

6. The negative electrode material for lithium ion secondary batteries, set forth in claim 1, wherein the number of the consolidated particles is 3 to 50.

7. The negative electrode material for lithium ion secondary batteries, set forth in claim 1, wherein the highly crystalline carbon layer has a thickness of 0.05 to 2 μm.

8. A method for producing a negative electrode material for lithium ion secondary batteries set forth in claim 1, which comprising the following steps:

(1) a granulation step of subjecting a slurry containing primary spheroidized graphite particles of 5 to 40 μm in average particle diameter and a phenolic resin, to produce secondary particles of 10 to 200 μm in average particle diameter, (2) a step of subjecting the secondary particles to pressure molding at 5 to 50 kN to produce a molded material of secondary particles, (3) a disintegration step of disintegrating the molded material of secondary particles to obtain disintegrated particles of 10 to 50 μm in average particle diameter, (4) a firing step of heating the disintegrated particles in an inert gas atmosphere at 800 to 1,500° C. for 0.5 to 10 hours to obtain fired particles, and (5) a CVD step of subjecting the fired particles to a CVD in a fluidized bed to form highly crystalline carbon on the surfaces of the fired particles.

9. A negative electrode for lithium ion secondary batteries, which incorporates a negative electrode material for lithium ion secondary batteries set forth in claim 1.

10. A lithium ion secondary battery which uses a negative electrode set forth in claim 9.

* * * * *